United States Patent [19]

Fisher et al.

[11] Patent Number: 4,882,757
[45] Date of Patent: Nov. 21, 1989

[54] SPEECH RECOGNITION SYSTEM

[75] Inventors: William M. Fisher; Michael L. McMahan, both of Plano; George Doddington, Richardson; Enrico L. Bocchieri, Dallas, all of Tex.

[73] Assignee: Texas Instruments Incorporated, Dallas, Tex.

[21] Appl. No.: 302,998

[22] Filed: Jan. 26, 1989

Related U.S. Application Data

[63] Continuation of Ser. No. 856,534, Apr. 25, 1986, abandoned.

[51] Int. Cl.$^4$ ................................................. G10L 5/00
[52] U.S. Cl. ...................................... 381/43; 364/513.5
[58] Field of Search .................................... 381/41–43; 364/513.5

[56] References Cited

U.S. PATENT DOCUMENTS

| | | | |
|---|---|---|---|
| 4,156,868 | 5/1979 | Levinson | 381/43 |
| 4,277,644 | 7/1981 | Levinson et al. | 381/43 |
| 4,319,221 | 3/1982 | Sakoe | 381/43 |
| 4,489,435 | 12/1984 | Mosher | 381/43 |
| 4,624,008 | 11/1986 | Vensko et al. | 381/43 |

Primary Examiner—Emamuel S. Kemeny
Attorney, Agent, or Firm—William E. Hiller; N. Rhys Merrett; Melvin Sharp

[57] ABSTRACT

Speech recognition is improved using prestored words and prestored sentences which provide grammar or context rules. Multiple word hypotheses and plural sentence hypotheses are used.

A speech recognition system uses a word hypothesizer to generate hypothesized words for a sentence recognizer. The sentence recognizer receives information containing the hypothesized word and its beginning and end points. The sentence recognizer compares each incoming hypothesis with words allowed by a grammar, and generates a partial or complete sentence hypothesis for each state in which the hypothesis is allowed by the grammar. A dynamic programming technique using backpointer is used to retain all currently valid partial and complete sentence hypotheses. When a complete sentence satisfies suitable criteria, it is output as a recognized sentence. Gaps and overlaps between hypothesized words are used in calculation of a sentence error for each partial and complete sentence hypothesis.

22 Claims, 3 Drawing Sheets

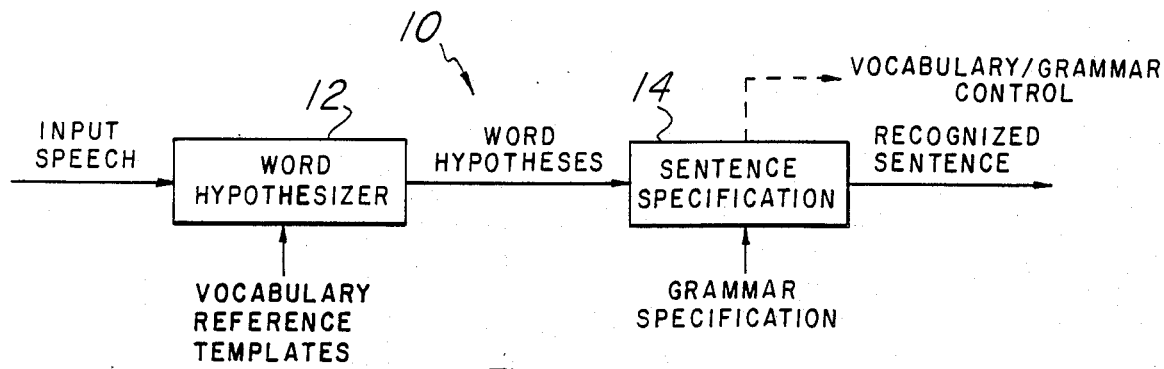
Fig. 1
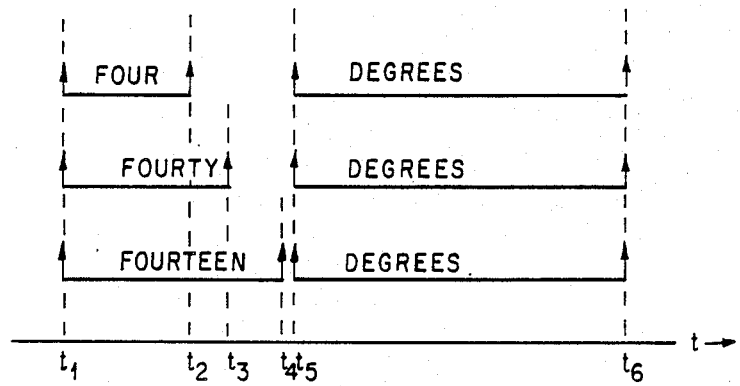
Fig. 2  Fig. 10
Fig. 3
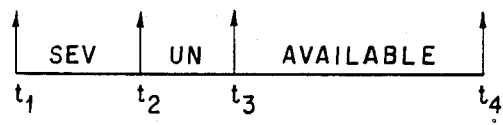
Fig. 4

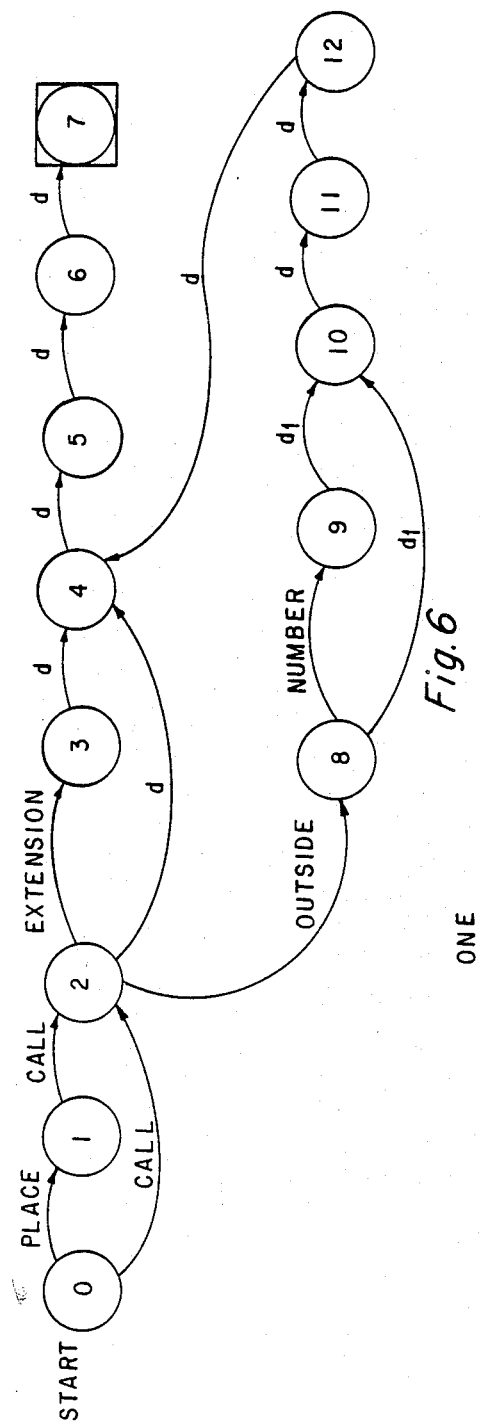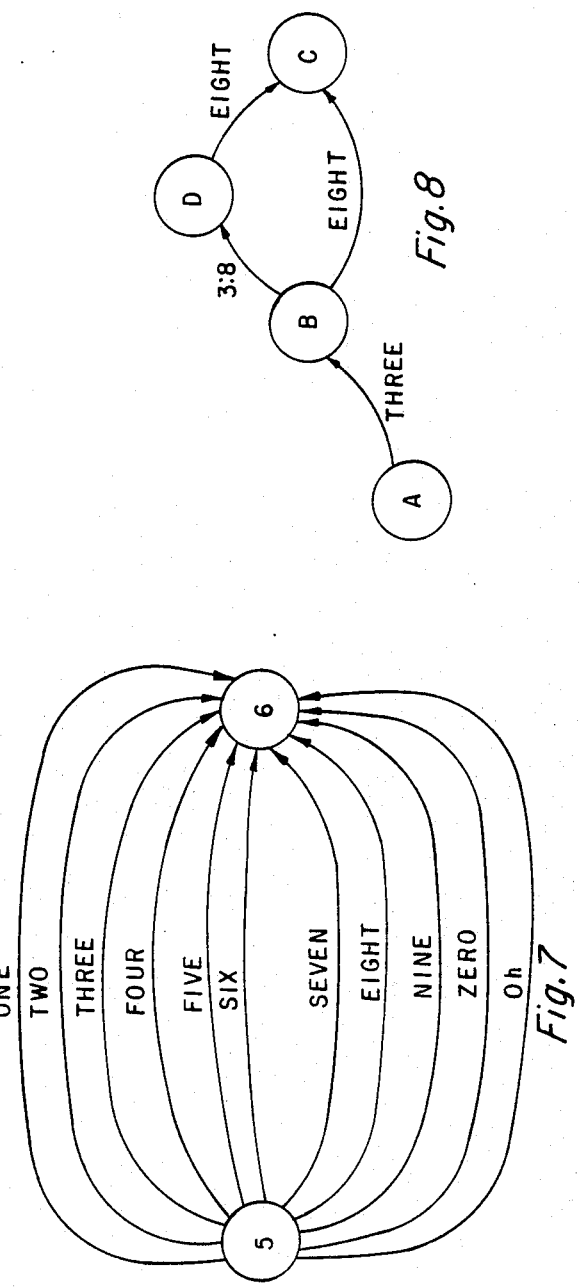

SPEECH RECOGNITION SYSTEM

This invention was made with Government support under Contract Nos. F30602-82-C-0112, awarded by the U.S. Department of the Air Force, and N00039-85-C-0162 awarded by the U.S. Department of the Navy. The Government has certain rights in this invention.

This application is a continuation of application Ser. No. 856,534 filed Apr. 25, 1986, now abandoned.

A microfiche appendix containing computer program listings and consisting of a single microfiche having 10 frames is submitted as part of the disclosure.

BACKGROUND AND SUMMARY OF THE INVENTION

The present invention relates to machine recognition of speech.

Computer recognition of speech has heretofore been a formidable problem. Rather than approach the entire problem, attempts have been made to restrict the problem to specific areas, thus simplifying the recognition task. Much previous work has been done on isolated word recognition, both speaker dependent and speaker independent, and digit recognition. Current systems are able to perform acceptably well for some applications, although by no means is recognition under even highly constrained circumstances completely reliable.

The problem of Continuous Word Recognition (CWR) is more difficult than isolated word recognition. Greater difficulties are encountered in determining which words are actually spoken, as well as how they should be linked together to form sentences.

Attempts to recognize all spoken sentences without any restraints does not appear to be within the capability of current technology. Prior attempts to narrow the problem area have resulted in use of grammars or other constricting methods to determine which words are allowed to follow other words. When a word is recognized, a determination is made of a set of next words which are allowed by the grammar. A word hypothesizer is then instructed to try to match the following utterance with that set.

Such prior art solutions produce systems which are too tightly constrained in terms of vocabulary and grammar which can be handled, and result in unacceptably high recognition error rates. If an error occurs anywhere during an utterance, it is often difficult or impossible to recover, and the speech sequence must be aborted and started over.

It is therefore an object of the present invention to provide a robust speech recognition system which can handle relatively complex vocabularies and grammars. It is another object of the present invention to provide a speech recognition system which can consider several sentence alternatives in parallel, and select the best one.

Therefore, according to the present invention, a word hypothesizer and sentence recognizer are provided which are loosely coupled. The word hypothesizer constantly generates word hypotheses based on an incoming speech signal. The sentence recognizer assembles the hypotheses into allowable partial and complete sentences. The output of the word hypothesizer is not restricted by feedback from the sentence recognizer. Techniques including the measurement of the time gaps and time overlaps between words can result in the inclusion of additional selection criteria.

The novel features which characterize the present invention are defined by the claims. The foregoing and other objects and advantages of the present invention will hereafter appear, and for purposes of illustration, but not of limitation, a preferred embodiment is shown in the accompanying drawings.

BRIEF DESCRIPTION OF THE DRAWINGS

FIG. 1 is a block diagram of a speech recognition system;

FIG. 2 is a data object for a word hypothesis;

FIG. 3 is a timing diagram for three hypotheses of an utterance;

FIG. 4 is a timing diagram for an utterance;

FIG. 6 is a state diagram defining a grammar for use in speech recognition;

FIG. 7 is a detailed diagram of a portion of FIG. 6;

FIG. 8 is a portion of a state diagram used in grammar definition illustrating transitional states;

FIG. 10 is a data object for a sentence hypothesis.

DESCRIPTION OF THE PREFERRED EMBODIMENT

Figure 5:
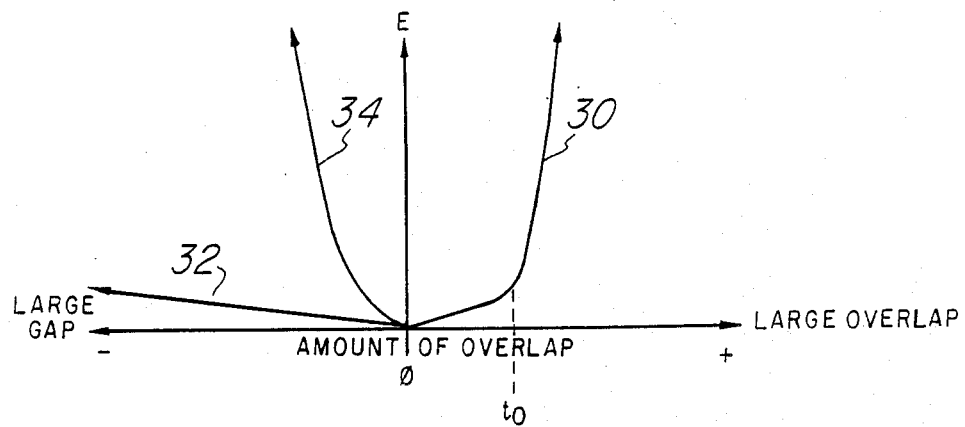
FIG. 5 is a graph showing error to be attributed to overlap and gaps in speech signals.

FIG. 1 shows a block diagram of a speech recognition system 10 according to the present invention. A word hypothesizer 12 accepts incoming speech signals, compares them to reference templates in its vocabulary, and generates word hypotheses. The input speech signals are preferably digitized signals, and the word ypothesizer 12 operates by dividing a sequence of speech samples into frames, extracting linear predictive coding (LPC) parameters, transforming the LPC parameters to a set of uncorrelated features, the Principal Feature Vector (PFV), and comparing them with the PFV parameters stored in vocabulary reference templates. Word hypothesizers generally are known in the art, and examples of hypothesizers which may be used with the present invention are described in U.S. patent application Ser. No. 461,884, SPEAKER-DEPENDENT CONNECTED-SPEECH WORD RECOGNIZER, by George Doddington, et al, filed January 28, 1983, abandoned in favor of continuation application Ser. No. 013,154 filed February 10, 1987 abandoned in favor of continuation application Ser. No. 110,062 filed October 13, 1987, and U.S. patent application Ser. No. 687,103, SPEAKER INDEPENDENT SPEECH RECOGNITION METHOD AND SYSTEM, by George Doddington, et al, filed December 27, 1984, abandoned in favor of continuation application Ser. No. 224,224 filed July 22, 1988 abandoned in favor of continuation application Ser. No. 290,816 filed December 22, 1988. A description of the use of the PFV can be found in Doddington, et al, RECOGNITION OF SPEECH UNDER STRESS AND IN NOISE, Proceedings of the ICASSP, 1986, number 14.10, page 733.

The information contained in each word hypothesis is shown in FIG. 2. This information consists of the hypothesized WORD, an ERROR value, and START and STOP TIMES for the word. The value ERROR indicates the confidence which the hypothesizer 12 places in its guess, and is determined by an appropriate metric indicating the "distance" between the template of the hypothesized word and the parameters of the actual word. A relatively large value for ERROR indicates a greater likelihood that the hypothesis is incorrect, while a relatively smaller value for ERROR indicates an increased likelihood that the word was correctly recognized.

START-TIME and STOP-TIME are the actual start and stop times of the input speech vocalizations which generated the word hypothesis. The length of the actual utterance is given by(STOP-TIME)-(START-TIME). These values are used by a sentence recognizer 14, as described below, in order to improve overall recognition.

The word hypotheses are sent to the sentence recognizer 14, which attempts to construct sentences out of them. A grammar specification is used to assist the recognizer 14 in assembling the hypotheses into sentences. The grammar is preferably a finite-state grammar, and restricts those sentences which are recognized as valid by the system 10. Once the sentence recognizer 14 successfully recognizes a sentence, the recognized sentence is output from the speech recognition system 10.

Unlike prior art systems, the word hypothesizer 12 and the sentence recognizer 14 are preferably not closely coupled. In other words, there is no direct feedback between the sentence recognizer 14 and the word hypothesizer 12. The word hypothesizer 12 constantly generates all hypotheses which match its reference templates. This is a departure from prior art systems that use a sentence recognizer which controls the word hypothesizer, constraining it to hypothesize only words which are considered to be valid next words by the recognizer. The present approach causes the hypothesizer 12 to generate a greater number of possible words, and increases the complexity of the sentence recognizer 14. In return, the system has a greater flexibility and the ability to "change its mind" about its current location in the grammar.

As used herein, the terms "word" and "sentence" are not restricted to their common meanings. As used herein, a word is some basic unit of speech utterance, and a sentence is some structure made up of such basic units. For example, a "word" could be a phoneme and a "sentence", which is a structure made up of such phonemes, could correspond to English words. Or, the basic unit of utterance could be a phrase, so that a "word" would actually consist of three or four English words, and a "sentence" would be a structure comprised of these phrases. Thus, while the embodiment described herein uses the terms "words" and "sentences" to mean English words and English sentences as constrained by a selected grammar, it will be understood that the present invention is not so limited.

The recognition thresholds of word hypothesizer 12 are preferably set to a level where many hypotheses are generated. That is, the constraints for determining whether a valid hypothesis has been made are loosened, or broadened. This means that the hypothesizer 12 will often generate multiple hypotheses for a single utterance.

Such a situation is shown in FIG. 3. This illustrates several hypotheses that may be generated by the utterance "FOURTEEN DEGREES". Assuming the hypothesizer's vocabulary includes the words "FOUR", "FORTY" and "FOURTEEN", it is likely that the hypothesizer 12 will generate all three of these words as valid hypotheses during the utterance of the word "FOURTEEN". If the speech system is being used to input information to a navigational system, for example, it is important that the sentence recognizer 14 be able to discriminate between the phrases "FOUR DEGREES", "FORTY DEGREES" and "FOURTEEN DEGREES".

The sentence recognizer 14 of the present invention makes this discrimination by introducing error terms for overlap of or gaps between words, in addition to those error terms which indicate confidence in recognition of the words themselves. The magnitude of the gap and overlap error terms increases with the degree of the misfit between consecutive words. The hypothesis "FOUR DEGREES" has a gap of duration $t_5-t_2$, "FORTY DEGREES" has a gap duration of $t_5-t_3$, and "FOURTEEN DEGREES" has a gap duration of $t_5-t_4$. The sentence recognizer 14 calculates these gap durations, and the corresponding gap errors, by making use of the start time and stop time information transmitted from the word hypothesizer 12 as part of the word hypothesis. In FIG. 3, assuming that the words "FOUR", "FORTY" and "FOURTEEN" generate approximately equal word errors, which is a reasonable assumption, the sentence recognizer 14 will select the phrase "FOURTEEN DEGREES" as the best fit because such selection minimizes the gap errors. The inclusion of gap errors in partial and total sentence error calculations causes the sentence recognizer 14 to prefer hypotheses which explain a greater proportion of the total incoming utterance.

FIG. 4 illustrates the related problem of overlap. It is assumed that the word hypothesizer 12 recognizes the words "SEVEN", "AVAILABLE" and "UNAVAILABLE". It is also assumed that the grammar allows the sentence fragments "SEVEN AVAILABLE" and "SEVEN UNAVAILABLE".

When the phrase "SEVEN AVAILABLE" is spoken as a continuous utterance, the word hypothesizer 12 can be expected to generate the hypothesis "SEVEN" at time $t_3$, and the hypotheses "AVAILABLE" and "UNAVAILABLE" at time $t_4$. Both of these latter hypotheses may have approximately the same word error. The sentence recognizer 14 determines the correct utterance by detecting and preferring the lack of overlap between the word "SEVEN" and "AVAILABLE", whereas the hypothesis "SEVEN UNAVAILABLE" gives an overlap having duration $t_3-t_2$.

The error function for a sentence hypothesis, or a partial sentence hypothesis up to a given point, is:

$$\sum_{i+1}^{N+1} EW_i*(t_2^i - t_1^i) + ERR(t_1^i, t_2^{i-1}) \quad (1)$$

N = number of word hypotheses in the sentence
$EW_i$ = average (frame) error for word hypothesis i
$t_1^i$ = the beginning time of word hypothesis i
$t_2^i$ = the ending time of word hypothesis i
$t_2^0$ = the beginning of speech time
$t_1^{N+1}$ = the end-of-utterance time
ERR = error function for gap and overlap errors
overlap if $t_1^i < t_2^{i-1}$
gap if $t_1^i > t_2^{i-1}$ In the simple case, the functions EG and EO can be linear. That is, the gap and overlap errors increase linearly with increasing gap and overlap durations.

To improve accuracy, non-linear error functions may be used. FIG. 5 shows a graph of preferred functions for overlap and gap error calculations. When the amount of overlap is zero, no additional error term is introduced. When the amount of overlap is positive, an overlap has occured, and when the amount of overlap is negative a gap between word hypotheses has occurred.

Curve 30 on the right side of FIG. 5 shows the desired error function for overlap. When the amount of overlap is fairly small, up to time $t_0$, the overlap error is small. For overlap greater than $t_0$, the overlap error rises rapidly. This type of function takes into account co-articulation effects that often occur between words. That is, if approximately the same sound ends one word and begins a following word, that sound is usually uttered as only a single sound. The time $t_0$ will of course depend upon the particularities of an implementaion, but is preferably on the order of one-half phoneme in length, being approximately 60 milliseconds. By the time an overlap reaches a duration of 150 to 200 milliseconds, the overlap penalty should be fairly high. Of course, all of these numbers may be modified greatly depending upon circumstances such as talking speed of the speaker.

Gap errors are preferably divided into two classes as shown on the left hand side of FIG. 5. A gap between hypotheses that occurs when nothing is being said, such as when a speaker pauses to consider his next word, should not be heavily penalized. Thus, when the energy of the input speech signal indicates a value below some threshold, the sentence recognizer determines that nothing is being spoken and applies a low error value as shown by the lower curve 32. This low error value can be zero if desired. If, however, a gap error occurs between two hypotheses while speech energy is being received, a relatively high error value is assigned to the gap error as shown by the upper curve 34. This takes into account the fact that consecutive word hypotheses which are separated by a gap, while it is known that the speaker is speaking, are presumed to be missing part of the utterance and will tend to be rejected. This is shown, for example, in FIG. 3, where a hypothesis of a gap while the speaker is actually saying "TEEN" results in a large gap error and rejection of the sentence.

Gap and overlap error calculations can be used at the beginning and end of sentences. Any delay between the beginning of the sentence and the start of a hypothesized first word is counted as a gap error, as is delay between a hypothesized last word and the end of the sentence. Precise location of the sentence beginning and end points is not necessary. It will be appreciated that all hypotheses will show gap error when the sentence beginning is before the beginning of the earliest hypothesized word. In fact, these gap errors will cancel out when comparing sentence errors. Therefore, it is only necessary that the beginning of the sentence($t_2^0$) be no later than the start of the earliest hypothesized word ($t_1^1$). Sentence hypotheses having a first word which begins later than his will be penalized with a gap error. This will cause the sentence recognizer 14 to tend to prefer sentence hypotheses which account for speech starting at the beginning of an utterance. A similar calculation holds at the end of a sentence, where a hypothesis that the sentence is complete is penalized by gap error if the speaker continues to talk.

In order to improve the performance of the speech recognizer 10, it is preferred to constrict the set of sentences which are allowed. The sentence recognizer 14 uses some type of grammar in order to restrict the choice of sentences which can be identified. For ease of implementation, this grammar is preferably a finite state grammar, which has a finite number of nodes, or states.

FIG. 6 shows a graph of a very simple finite-state grammar. This grammar would be useful for using spoken instructions to place telephone calls. As shown in FIG. 6, the grammar can be used to call an outside number, which requires that a 7-digit number be used, or an internal number which requires only the use of a 4-digit extension. The utterances which cause each transition are shown next to the transitional paths on the diagram. The transitions marked with "d" are shown in more detail in FIG. 7, which indicates that any digit may be used. The transition $d_1$, found between state pairs 8, 10 and 9, 10 is more restricted in that the first digit of an exchange cannot begin with 0 or 1.

The set of allowable sentences from the grammar of FIG. 6 is shown in Table I.

The allowed sentences shown in Table I are easily seen to be generated by tracing the connecting arrows on the directed graph of FIG. 6. The grammar can be

TABLE I

| |
|---|
| CALL dddd |
| CALL EXTENSION dddd |
| PLACE CALL dddd |
| PLACE CALL EXTENSION dddd |
| CALL OUTSIDE $d_1$dd dddd |
| CALL OUTSIDE NUMBER $d_1$dd dddd |
| PLACE CALL OUTSIDE NUMBER $d_1$dd dddd |
| PLACE CALL OUTSIDE $d_1$dd dddd | considered to be a finite-state machine, with each of the possible states represented by a numbered node. All possible sentences allowed by the grammar can be generated by tracing all possible paths through the directed graph. For example, the allowed sentence "CALL EXTENSION dddd" causes the grammar to pass through states 0 (start), 2, 4, 5, 6 and 7. Node 7 has a square around it to indicate that it is a terminal node. That is, when the sentence recognizer 14 reaches node 7, it hypothesizes that a complete sentence has been uttered, and proceeds accordingly.

The grammar of the sentence recognizer 14, as represented by the graph of FIG. 6, can be used in different ways to assist in the recognition of an utterance. The simplest way is for the sentence recognizer 14 to control the vocabulary referenced by the word hypothesizer 12, so that, from a given node, only words which fall within the set of allowed next words from that node may be hypothesized by the word hypothesizer 12. For example, in such a system, if the sentence recognizer 14 determined that it was currently at node 2, the word hypothesizer 12 would be constrained by the VOCABULARY CONTROL signal of FIG. 2 to recognize only the words "OUTSIDE", "EXTENSION", or a digit. In this type of arrangement, the sentence recognizer 14 is used as a predictor, and is tightly coupled with the word hypothesizer 12 to attempt to improve the performance of the system.

However, such a predictive recognition technique has a number of drawbacks. If the system ever reaches an "incorrect" node, there is no method by which it can recover. In contrast, the preferred embodiment employs a dynamic programming (DP) technique which allows multiple hypotheses to be considered in parallel. Rather than being constrained to a single path through the grammar, the DP technique allows the sentence recognizer to choose the best path given all of the information concerning the various words. This technique utilizes the gap and overlap error technique described previously. It optimizes a given path error at the sentence or partial sentence level rather than at the local optimization level employed by earlier tightly-coupled systems.

In the preferred DP technique, the sentence recognizer 14 receives a word hypotheses from the word hypothesizer 12 and determines all of the nodes in the graph to which that word could apply. For example, in FIG. 6, if a digit is uttered the sentence recognizer 14 will try to make that digit correspond with all of nodes 4, 5, 6, 7, 11 and 12. If the uttered digit is in the range 2–9, the sentence recognizer 14 will attempt to associate it with node 10 as well.

For each node for which a current hypothesis is valid, the sentence recognizer 14 uses DP with backward pointers to determine all possible sentence fragments for which the current hypothesis would be the latest word. When the current hypothesis is tested on a particular node, that node must have a valid sentence fragment leading to a preceding node in order to create a new valid sentence fragment. For example, when th first digit is hypothesized, the recognizer 14 will try to match that digit with the nodes described above. If a digit is the first utterance of a sentence, the grammar will be in state 0, and the hypothesis of a digit will be rejected as invalid. That is, of the nodes to which a digit can be a valid transition, none of them have a previous state of node 0.

If the utterance "CALL" has been received, an entry will be made as a partial sentence which brings the grammar to node 2. If a digit is then hypothesized, node 4 will have a valid previous node (node 2), so a sentence fragment will be hypothesized as "CALL first-digit". Nodes 5, 6, 7, 10, 11 and 12 will still not generate valid partial sentences because there does not exist a valid partial sentence terminating in a preceding node to any of these nodes.

The DP technique generates a number of hypothesized partial sentences, all of which are considered in parallel. When a sentence hypothesis reaches node 7, a complete sentence is hypothesized. At that point, at least one valid complete sentence has been hypothesized, and a total sentence error is calculated as set forth in equation (1). If the sentence error is too large, due to large errors in words or gap and overlap errors, the sentence hypothesis is rejected. If the sentence error falls below some predetermined threshold, the sentence hypothesis is retained. In the preferred embodiment, a valid sentence hypothesis is accepted as the uttered sentence only if the speaker stops speaking or no better partial sentence hypothesis is generated within a short time. For example, if no utterances are made for 800 milliseconds, the sentence hypothesis can be accepted, as it is assumed that the speaker has finished a sentence in the grammar. If additional utterances are made, and they result in a partial or complete sentence hypothesis having a lower error than the current sentence hypothesis, the sentence recognizer 14 will reject the older sentence hypothesis in favor of the later. If the additional utterances do not generate a partial or complete sentence hypothesis having a lower error than the current sentence hypothesis, such hypothesis will be accepted. It is not necessary for speech to cease before generating a recognized sentence; such generation is determined by the grammar.

As a simple example, the utterance "CALL dddd (silence)" will cause the sentence recognizer 14 to recognize a complete sentence. For purposes of this description of the recognizer, during recognition of such an utterance it will be assumed that the word hypothesizer 12 generates no "bad" hypotheses. However, in actual use the hypothesizer 12 will generate hypothesis which may not be very good, and the purpose of using the overall sentence error calculation, as well as the various gap and overlap error calculations, is to cause the correct utterance to be recognized in preferance to the incorrect ones by a simple comparison of sentence error values.

The hypothesis "CALL" is valid only for node 2, so the sentence recognizer 12 will generate a partial sentence corresponding to node 2 and having the value CALL. When the first digit is received, node 4 is the only valid node for a digit hypothesis that also has a previous node containing a currently valid sentence fragment. That is, a back pointer from node 4 to node 2 shows that there is a sentence fragment corresponding to node 2. Tracing back one step from each of node 5, 6, 7, 10, 11 and 12 does not point to any node which terminates a sentence fragment, so the hypotheses that the first digit applies to nodes 5, 6, 7, 10, 11 or 12 are rejected.

When the second digit is received, it may be applied to node 5 because node 4 was associated with a valid partial sentence as a result of the first digit. Also, the second digit may be hypothesized to apply to node 4. Thus, the sentence recognizer 14 now retains the partial sentence hypotheses "CALL", "CALL first-digit", "CALL first-digit second-digit", and "CALL second-digit". If a sentence recognizer were to stop at this point, the fragment "CALL first-digit second-digit" should be preferred because it best explains the received speech data. That is, assuming the word errors for each word to be of approximately the same degree, the longer sentence hypothesis minimizes gap errors.

This procedure is continued until the sentence hypothesis "CALL first-digit second-digit third-digit fourth-digit" is received. At this point, with "fourth-digit" assigned to node 7, a complete sentence is hypothesized. When the speaker quits talking, if the total sentence error as calculated by equation (1) is less than some predetermined threshold, this hypothesis will be accepted as an actual sentence.

A more complicated utterance would be "PLACE CALL OUTSIDE NUMBER 543 6789(silence)". As can be seen viewing the graph of FIG. 6, several partial sentence hypotheses will be considered in parallel by the sentence recognizer 14. For example, the complete sentence "PLACE CALL 5436" will be considered as a valid hypothesis in parallel with the partial sentence "PLACE CALL OUTSIDE NUMBER 543 6". Since a substantial gap exists between the word "CALL" and the first digit, the shorter sentence hypothesis will result in a much larger error calculation when gap errors are included. Thus, the longer hypothesis will eventually be preferred by the sentence recognizer 14.

Table II shows the actions of the sentence recognizer 14 when recognizing the sentence "PLACE CALL OUTSIDE NUMBER 543 6789(silence)". For purposes of illustration, it is again assumed that the word hypothesizer 12 does not generate any false hypotheses.

For each utterance, Table II shows which nodes of the graph of FIG. 6 become associated with it, and shows all back pointers to previously valid nodes. No back pointers are created to nodes which have not yet been associated with any valid partial sentence. Thus, no back pointer is created from node 4 to node 12 until after node 12 has been associated with a hypothesis. This occurs only after the utterance "6" is received.

Since multiple word hypotheses can be associated with each node, Table II differentiates between them with alphabetic suffixes. Thus, node "4a" has the number "5" associated with it, while node "4b" is associated with the utterance "4". A partial or complete sentence hypothesis is defined by backtracking pointers from the current word hypothesis to the start node. For example, according to Table II, the sentence hypothesis "PLACE CALL OUTSIDE NUMBER 543 6789" follows backpointers from node 7 to node 0 in the order 7d, 6d, 5d, 4d, 12a, 11a, 10a, 9, 8, 2,1,0. The partial sentence hypothesis "PLACE CALL 543" follows backpointers through nodes 6a, 5a, 4a, 2, 1, 0.

TABLE II

| UTTERANCE | BECOMES ASSOCIATED WITH NODE NUMBER(S) | BACKPOINTER TO NODE NUMBER |
|---|---|---|
| PLACE | 1 | 0(START) |
| CALL | 2 | 1 |
| OUTSIDE | 8 | 2 |
| NUMBER | 9 | 8 |
| "5" | 4a | 2 |
|  | 10a | 9 |
| "4" | 4b | 2 |
|  | 5a | 4a |
|  | 10b | 9 |
|  | 11a | 10a |
| "3" | 4c | 2 |
|  | 5b | 4b |
|  | 6a | 5a |
|  | 10c | 9 |
|  | 11b | 10b |
|  | 12a | 11a |
| "6" | 4d | 12 |
|  | 5c | 4c |
|  | 6b | 5b |
|  | 7a | 6a |
|  | 10d | 9 |
|  | 11c | 10c |
|  | 12b | 11b |
| "7" | 4e | 12a |
|  | 5d | 4d |
|  | 6c | 5c |
|  | 7b | 6b |
|  | 10e | 9 |
|  | 11d | 10d |
|  | 12c | 11c |
| "8" | 4f | 12a |
|  | 5e | 4e |
|  | 6d | 5d |
|  | 7c | 6c |
|  | 10f | 9 |
|  | 11e | 10e |
|  | 12d | 11d |
| "9" | 4g | 12a |
|  | 5f | 4f |
|  | 6e | 5e |
|  | 7d | 6d |
|  | 10g | 9 |
|  | 11f | 10f |
|  | 12e | 11e |

Examination Table II shows that certain decisions must be made each time a word hypothesis is associated with a node. These decisions involve deciding which node is the correct precursor for each node. For example, when "CALL" is assigned to node 2, the precursor could be either node 0 or node 1. The sentence error calculation (equation 1) is made for each possibility, and the best one selected. As shown in Table II, the selected precursor for node 2 is node 1, which selects the partial sentence hypothesis "PLACE CALL" over "CALL". This selection is made because the partial sentence hypothesis "CALL" includes a gap error-corresponding to the utterance of the word "PLACE".

Also, there may be multiple hypotheses assigned to a single precursor node. For example, when "7" is assigned to node 5d, possible precursor nodes are 4a, 4b, 4c and 4d. These four potential precursors must be examined, and the best selected. In our example, the partial sentence hypothesis 4d, when combined with 5d, yields the best next partial sentence hypothesis. Depending on the weighting factors given to gap and overlap errors, and the actual word errors, some of the precursor nodes may be selected differently than shown in Table II.

The sentence recognizer 14 creates a new data object each time a word hypothesis is associated with a node and a specific precursor node. Such a data object is shown in FIG. 10, and acts as a sentence hypothesis for a partial or complete sentence ending in that node. All hypotheses for a given node are formed into a linked list with the SAME-STATE-POINTERs, and nodes are linked to a previous node, using the PREVIOUS-STATE-POINTER.

The error of a complete sentence hypothesis is calculated by a recursive procedure which traces backpointers from the current node to the previous node, following the path giving the lowest scores. Since the intermediate partial sentence errors are stored with each node, this procedure only has to check back one level of recursion. A top level algorithm for performing such tracing is shown in equations (2) and (3):

$$\text{Sentence Error} = \text{Partial Sentence Error}(\text{Node 7}) \quad (2)$$

$$\text{Partial Sentence Error}(\text{node } n) = \text{Word Error}(\text{node } n) + \quad (3)$$
$$\text{gap overlap error}(\text{node } n, \text{ node } n - 1) +$$
$$\text{Partial Sentence Error}(\text{node } n - 1)$$

Equations (2) and (3) implement a DP algorithm. Tracing back through the selected nodes gives the sentence having the lowest error. Note that equations (2) and (3) are simply a recursive implementation of equation (1).

As shown in Table II, even a very simple utterance with a very simple grammar can result in a large number of partial sentence hypotheses being considered. In practical systems, computational power and memory resources will not be unlimited, and any of several schemes may be employed to eliminate "bad" partial sentence hypotheses on the fly.

The simplest would be to simply eliminate all partial sentence hypotheses which have a total error greater than predetermined threshold. This would tend to eliminate partial hypotheses having extremely large gap errors. In the example illustrated in Table II, the partial hypotheses "CALL 8" is considered valid. In actuality, due to the tremendously large gap errors between "CALL" and "8", such a sentence is unlikely to result in a preferred complete sentence hypothesis. Therefore, the sentence analyzer 14 can reject such partial hypotheses immediately, rather than retain it for later computational steps.

A more restrictive method would be to retain only a single sentence hypothesis for each word hypothesis. In the above example, only the best hypothesis would be assigned to a node, and multiple assignments to a node (e.g., 4a, 4b, 4c...) would be eliminated. Such a scheme is somewhat restrictive, and makes a recovery from error more difficult.

By the time all the computations shown in Table II are completed, the sentence recognizer 14 should recognize the actually uttered sentence as its best hypothesis. This hypothesis best accounts for all of the speech data received, minimizing gap and overlap errors between recognized words. All other hypotheses introduce gap errors, which give a total sentence error value which is larger than the correct one.

Current CWR systems will attempt to generate a valid sentence when the speaker stops talking. That is, a silence longer than some threshold value causes the recognizer to assume an end of sentence, and try to find the best match. The use of the present approach allows the recognizer 14 to easily understand pauses in the middle of an utterance. The recognizer 14 will not recognize a complete sentence hypothesis if there is a better partial sentence hypothesis. If the speaker pauses in the middle of a sentence, the sentence recognizer 14 will merely wait for speech to continue. A RECOGNIZED SENTENCE will be generated only if a complete sentence hypothesis has less error than some predetermined threshold. Since there is no large gap error associated with gaps of silence, the overall sentence error calculation will not be affected.

Theoretically, there is no limit to the length of the pause. A speaker could begin a sentence, stop, go home for the weekend, and return days later to complete the sentence. If the gap error assigned to silence was zero (which is quite likely), the recognized complete sentence would be identical to that which would be recognized as a result of a single complete utterance. In practice, this is rarely a desirable situation. In order to prevent arbitrarily large gaps from occurring in a sentence, a "time-out" may be used to limit them. If there is silence, or there is no word hypothesized, for a period exceeding the time-out, the sentence recognizer 14 can either output its best partial or complete sentence hypothesis so far, or can abort back to a start state, depending on the implementation or the preferences of the user. Setting a time-out of, for example, one minute causes the system to assume that a user does not intend to finish his sentence, after a pause of that length.

An implementation in FORTRAN of the above-described procedure is provided in the accompanying microfiche appendix, which is hereby incorporated by reference. This code has been implemented on a TI-Speech system on a Texas Instruments Personal Computer, using a Texas Instruments TMS320 signal processor.

In order to minimize gap and overlap errors, it is important to recognize that co-articulation and other effects often exist at the transitions between "words". In order to minimize a gap error which might otherwise appear to exist between consecutive spoken words, when that gap error does not actually exist, it may be necessary to introduce extra states into the grammar. For example, it is very common for a speaker to insert transitional sound between speaking the consecutive digits "3" and "8".

The actual utterance often sounds similar to "three-/IE/-eight", where /IE/ is the transitional sound between the final /I/ of "three" and the initial /E/ of "eight". Even though the speaker actually left no gap between the digits 3 and 8, the recognizer 14 may add one there, since there will be no word hypothesized for "/IE/". This could distort the calculated error value for the sentence.

FIG. 8 shows the insertion of a transition state in a grammar whenever the digits 3 and 8 can form a valid utterance according to the grammar. The transitional utterance is shown in FIG. 8 as "3:8", so that speakers which include such a transition will cause the grammar to change states from A to B to D to C instead of directly from A to B to C. Consideration of these types of transitional effects can greatly improve the recognition capability of the system, and is especially useful in speaker independent recognition systems in which the speaking habits of different users may vary.

Figure 9:
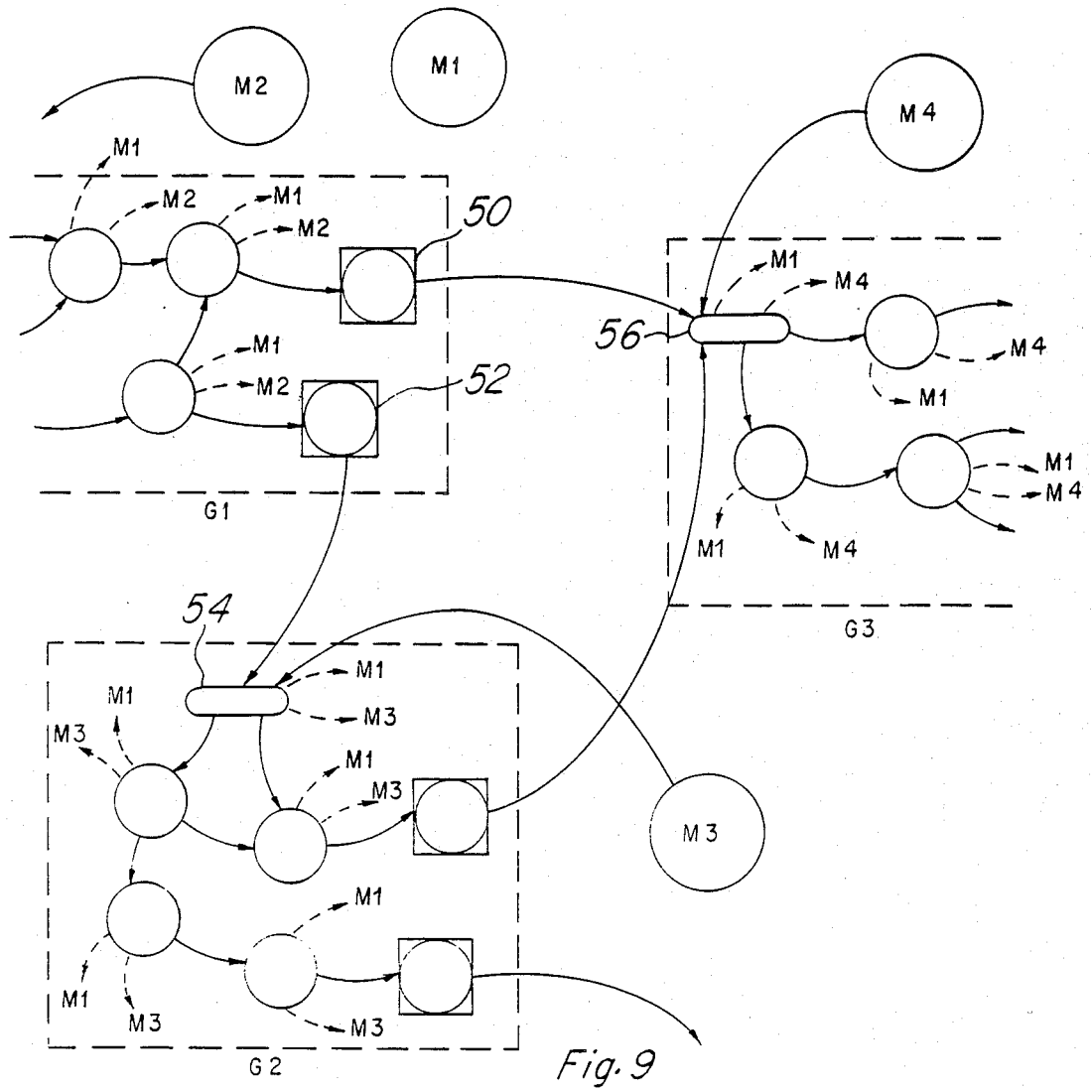
FIG. 9 is a state diagram illustrating the use of multiple grammar subsets.

FIG. 9 illustrates additional desirable features of an actual implementation. First, it would be desirable for a system to include "meta-commands". These commands are defined to be those which are a valid transition from every state. Examples of such commands would be "ABORT" and "CANCEL". The ABORT command can be used to reset the recognizer to a start state in the overall grammar regardless of its current position. The CANCEL command can be used to back up to the beginning of the current grammar in a bank-switched grammar as described below. These type commands are especially useful where the recognizer system echoes the current best partial sentence hypothesis to a visual device such as a computer display screen. The user can observe the actions of the recognizer on the screen, and ABORT or otherwise change his input command as desired. As shown in FIG. 9, every state is a valid precursor state for the meta-commands M1, and every state within a grammar is a valid precursor for the appropriate meta-command M2, M3 or M4.

FIG. 9 also illustrates another extremely useful feature for systems which have limited computing power. This involves the use of bank-switching of grammars and vocabulary. FIG. 9 shows parts of three grammars, G1, G2 and G3, which form part of a larger, more complex grammar. When a terminal node 50, 52 is reached in grammar G1, this indicates to the system that the data for grammars G2 or G3 should be loaded into the system, whichever is appropriate. A transition to the appropriate initial state 54, 56 of the new grammar G2 or G3 is then made automatically. The processor can then continue processing in the new grammar.

The transition to a new grammar or vocabulary is made whenever a terminal node is reached in a previous grammar. It is not necessary that the switching take place at the end of an English sentence, or where there is a pause in speech. Since the grammar can detect the end of a sentence as defined in that grammar while speech continues, the terminal nodes of the subgrammars G1, G2 and G3 can be located as desired, without reference to silences which may occur in the INPUT SPEECH.

The new grammar may also have a new vocabulary associated with it. If the vocabulary of the recognition system is limited due to limited processing or memory capacity, it may be necessary or desirable to switch in a new bank of vocabulary templates when a new grammar is loaded in. It is not necessary that the grammar and vocabularies be bank-switched at the same time, although such a break along common lines would tend to occur in many cases.

The meta-command ABORT should remain valid for all combinations of vocabulary and grammar. The meta-command CANCEL, which resets to the start of the current grammar, differs slightly for each grammar. The meta-commands M2, M3 and M4 reset grammars G1, G2 and G3 respectively. If the CANCEL command is implemented in a system, it should be valid for all combinations of vocabulary and grammar.

The bank-switching of grammars and vocabularies could be termed "virtual grammars", and "virtual vocabularies". This simply means that the grammar or vocabulary which applies to the entire system is larger than can be handled directly by the processor at one time. This is somewhat analogous to the concept of virtual memory in a computer system, where the virtual memory is much larger and can be accessed directly by the processor.

It will be appreciated that bank-switching the vocabulary and grammar implies feedback between the sentence recognizer 14 and the word hypothesizer 12. That is, the word hypothesizer 12 is constrained by the selection of a vocabulary by the sentence recognizer to hypothesize only certain words. Thus, in bank-switched systems, the decoupling of the word hypothesizer 12 and the sentence recognizer 14 is not complete. However, the coupling is much less than occurs in typical tightly-coupled systems. Free selection of hypotheses within the current vocabulary is still allowed by the bank-switched system. Within the scope of operation of any given vocabulary/grammar combination, the decoupling between the word hypothesizer 12 and the sentence recognizer 14 is complete. That coupling which occurs does so only because of, and to the degree determined by, the limited resources of the system 10.

Some amount of time will be required for the grammar and vocabulary switching operations to take place. Even if this time is only a few tens of milliseconds, this is a long delay for a recognition system which uses data frames typically having a length of ten or twenty milliseconds. It is thus preferable that the system have a buffer which is used for the digitized INPUT SPEECH data. This buffer can continue to collect data while the vocabulary or grammar bank-switching operations are accomplished, and processing can then continue from the point where it left off. This allows a small system to make use of large and complex vocabularies and grammars, without missing any of the incoming speech.

TECHNICAL ADVANTAGES

The speech recognition system described above makes a robust, low-cost system. The use of a decoupled word hypothesizer and sentence recognizer allow much greater flexibility in system operation, and a greater chance to recover from erroneous word hypotheses. The use of gap and overlap errors improves system performance by making the sentence recognizer more tolerant of erroneous hypotheses, since these can be placed in context both as relates to the grammar, and as relates to time. Bank switching of vocabularies and grammars allows a relatively simple system to perform complex tasks, and the implementation of meta-commands allows a user to easily recover from any system errors that do arise.

The system is easily implemented using available technology. The word hypothesizer 12 and sentence recognizer 14, along with associated memory and controllers, can be implemented on a single board for use with a personal computer. For example, TMS320 signal processors can be used for the word hypothesizer 12 and sentence recognizer 14. The recognition procedure described above is easily implemented in machine language, FORTRAN, or as otherwise desired, in accordance with known principles.

The present invention has been illustrated by the system described above, and it will become apparent to those skilled in the art that various modifications and alterations may be made thereto. Such variations fall within the spirit of the present invention, the scope of which is defined by the appended claims.

What is claimed is:

1. A method for selecting a sentence, formed from a sequence of hypothesized words, from a plurality of hypothesized sentences, comprising the steps of:
    (a) determining beginning and end points for each hypothesized word in each hypothesized sentence;
    (b) determining a word error for each hypothesized word in each hypothesized sentence which indicates a likelihood of the hypothesized word having been incorrectly hypothesized;
    (c) determining whether any gaps occur between consecutive hypothesized words in each hypothesized sentence;
    (d) assigning error values to any gaps determined in step (c);
    (e) determining whether any overlap occurs between consecutive hypothesized words in each hypothesized sentence;
    (f) assigning error values to any overlaps determined in step (e);
    (g) summing the word errors, gap errors and overlap errors for each hypothesized sentence, and
    (h) generating an indicator of the selected sentences as being the hypothesized sentence with the smallest sum as determined in step (g).

2. The method of claim 1, further comprising the steps of:
    (i) determining whether gap occurs between the beginning of each hypothesized sentence and the beginning of the first hypothesized word therein;
    (j) assigning an error value to any gap determined in step (i);
    (k) determining whether gap occurs between the end of each hypothesized sentence and the end of the last hypothesized word therein;
    (l) assigning an error value to any gap determined in step (k); and
    (m) including the errors assigned in steps (j) and (l) with the summation of step (g).

3. The method of claim 2, wherein gap errors, overlap errors and word errors are assigned as each word is hypothesized, and wherein a partial sentence error is calculated for each hypothesized sentence by summing all errors so far assigned each time a word is hypothesized.

4. The method of claim 1, wherein gap errors are assigned in step (d) only to those gaps which correspond to speech which did not generate a hypothesized word.

5. The method of claim 2, wherein gap errors are assigned in steps (j) and (l) only to those gaps which correspond to speech which did not generate a hypothesized word.

6. A method for determining a best sentence hypothesis corresponding to a sequence of hypothesized words, each having a word error and start and stop times associated therewith, comprising the steps of:
    (a) generating all possible word hypotheses for an utterance and comparing each hypothesized word to a grammar specification;
    (b) determining whether, within the constraints of the grammar, each hypothesized word can be validly attached to the end of any existing partial sentence hypotheses and identifying such existing partial sentence hypotheses;

(c) creating new partial sentence hypotheses by attaching each hypothesized word to the end of an identified partial sentence hypotheses for each valid attachment;

(d) determining whether any partial sentence hypotheses are complete sentence hypotheses within the grammar specification;

(e) calculating a complete sentence hypothesis error for each complete sentence hypothesis; and (f) selecting a complete sentence hypothesis based on the results of step (e).

7. The method of claim 6, wherein the selected complete sentence hypothesis is that complete sentence hypothesis which first has a complete sentence hypothesis error less than a predetermined threshold and which has no subsequent complete sentence hypotheses having a complete sentence hypothesis errors less than its own.

8. The method of claim 6, wherein the selected complete sentence hypothesis is that complete sentence hypothesis which first has a complete sentence hypothesis error less than a predetermined threshold and which has no subsequent complete sentence hypotheses having complete sentence hypothesis errors less than its own which are generated within a predetermined period after its complete sentence hypothesis error is calculated.

9. The method of claim 6, wherein a partial sentence hypothesis error is calculated each time a new partial sentence is hypothesized, and wherein step (e) comprises the step of calculating a partial sentence hypothesis error for the partial sentence hypothesis ending in the newly added hypothesized word.

10. The method of claim 9, wherein the partial sentence hypothesis error calculation comprises the steps of:

(g) associating a word error with each hypothesized word;

(h) associating a gap error with each hypothesized word which begins after the end of the last word in the partial sentence hypothesis identified in step (b);

(i) associating an overlap error with each hypothesized word which begins before the end of the last word in the partial sentence hypothesis identified in step (b);

(j) summing the errors associated with each hypothesized word in steps (f), (g) and (h) together with the partial sentence error of the partial sentence hypothesis identified in step (b) to give a new partial sentence hypothesis error; and (k) associating the new partial sentence hypothesis error with the new partial sentence hypothesis created in step (c).

11. The method of claim 10, wherein the gap error of step (h) is zero whenever silence is associated with the gap between consecutive hypothesized words.

12. The method of claim 6, further including the step of:

(l) selecting a partial sentence hypothesis to be a best complete sentence hypothesis if a predetermined period elapses wherein no words are hypothesized.

13. The method of claim 6, further including the step of:

(m) aborting the best sentence determination if a predetermined period elapses wherein no words are hypothesized.

14. The method of claim 6, wherein the grammar specification includes states representing transitional utterances commonly occuring between selected pairs of connected words.

15. The method of claim 6, further comprising the step of:

(n) when a complete sentence is selected, changing to a second grammar specification, wherein additional partial and complete sentences are generated according to the second grammar specification.

16. The method of claim 15, wherein a complete sentence according to the first grammar must be followed by a pause.

17. A speech recognition system comprising:

a speech input device for receiving speech input and generating a continuous sequence of speech frames representing the speech;

a plurality of reference templates, each template containing sequences of reference speech frames defining words to be recognized;

word hypothesizer means coupled to said speech input device and to said reference templates for matching the continuous sequence of speech frames with said reference templates as each new frame is received from said speech input device and generating at its output a plurality of word hypotheses for all sequences of speech frames which match a reference template, each individual word hypothesis of said plurality of word hypotheses corresponding to a particular word of speech to be recognized being distinguished by an error value indicative of the degree of similarity between the hypothesized word and the reference template matched thereto and defining a confidence factor, and a start time and a stop time corresponding to the actual start and stop time of the sequence of speech frames from which the word hypothesis is generated by said word hypothesizer means;

a grammar specification which defines all allowable sentences to be recognized; and sentence recognizer means coupled to said grammar specification, said sentence recognizer means having an input coupled to the output of said word hypothesizer means as the only coupling therebetween for receiving each word hypothesis as generated by said word hypothesizer means and determining whether such hypothesized word is a valid continuation, according to said grammar specification, of any partial sentence hypothesis generated so far, and if so, generating a new partial sentence hypothesis or complete sentence hypothesis including such hypothesized word.

18. A speech recognition system as set forth in claim 17, wherein said sentence recognizer means is responsive to overlap of or gaps between hypothesized words as identified by start time and stop time data from said word hypothesizer means for generating error terms in addition to said error values defining said confidence factors for each of said word hypotheses, and said sentence recognizer means determining whether a hypothesized word is a valid continuation of any partial sentence hypothesis generated so far based upon an analysis of said error terms indicative of overlap of or gaps between hypothesized words and said error values defining said confidence factors for each of said word hypotheses.

19. A speech recognition system as set forth in claim 18, wherein said sentence recognizer means generates a total sentence error including said error terms and said error values in determining a valid complete sentence hypothesis.

20. A speech recognition system as set forth in claim 19, wherein said sentence recognizer means is provided with a predetermined sentence acceptance threshold as to the maximum total sentence error to be tolerated in determining a valid complete sentence hypothesis such that proposed complete sentence hypotheses exceeding said maximum total sentence error are rejected.

21. A speech recognition system as set forth in claim 19, wherein said total sentence error is generated by said sentence recognizer means in accordance with the relationship:

$$\sum_{i+1}^{N+1} EW_i^*(t_2^i - t_1^i) + ERR(t_1^i, t_2^{(i-1)})$$

where
N = number of word hypotheses in the sentence;
$EW_i$ = average (frame) error for word hypothesis i;
$t_1^i$ = beginning time of word hypothesis i;
$t_2^i$ = ending time of word hypothesis i;
$t_2^0$ = beginning of speech time;
$t_1^{N+1}$ = end of utterance time;
EER = error function for gap and overlap errors;
overlap if $t_1^i < t_2^{i-1}$; and
gap if $t_1^i > t_2^{i-1}$.

22. A speech recognition system as set forth in claim 19, wherein said word hypothesizer means is provided with a recognition threshold at a level tending to increase the number of reference templates matching each sequence of speech frames thereby favoring the generation of multiple word hypotheses for all sequences of speech frames by said word hypothesizer means.

* * * * *